(12) United States Patent
Chu

(10) Patent No.: US 7,698,178 B2
(45) Date of Patent: Apr. 13, 2010

(54) ONLINE GAME ADVERTISING SYSTEM

(75) Inventor: Viva Chu, San Leandro, CA (US)

(73) Assignee: Massive Incorporated, New York, NY (US)

( * ) Notice: Subject to any disclaimer, the term of this patent is extended or adjusted under 35 U.S.C. 154(b) by 578 days.

(21) Appl. No.: 11/285,676

(22) Filed: Nov. 22, 2005

(65) Prior Publication Data

US 2006/0085261 A1   Apr. 20, 2006

Related U.S. Application Data

(63) Continuation of application No. 10/351,031, filed on Jan. 24, 2003.

(51) Int. Cl.
*G06Q 10/00* (2006.01)
(52) U.S. Cl. .............................. 705/28; 705/14; 705/26; 705/27; 463/40; 463/41; 463/42
(58) Field of Classification Search ................. 705/28
See application file for complete search history.

(56) References Cited

U.S. PATENT DOCUMENTS

| | | | |
|---|---|---|---|
| 5,105,184 A | 4/1992 | Pirani et al. |
| 5,446,919 A | 8/1995 | Wilkins et al. |
| 5,643,088 A | 7/1997 | Vaughn et al. |
| 5,823,879 A | 10/1998 | Goldberg et al. |
| 5,946,664 A | 8/1999 | Ebisawa |
| 5,964,660 A | 10/1999 | James et al. |
| 6,012,984 A | 1/2000 | Roseman |
| 6,026,368 A | 2/2000 | Brown et al. |
| 6,036,601 A | 3/2000 | Heckel |
| 6,061,659 A | 5/2000 | Murray |
| 6,102,406 A | 8/2000 | Miles et al. |
| 6,179,713 B1 | 1/2001 | James et al. |
| 6,183,366 B1 | 2/2001 | Goldberg et al. |
| 6,196,920 B1 | 3/2001 | Spaur et al. |
| 6,205,432 B1 | 3/2001 | Gabbard et al. |
| 6,243,104 B1 | 6/2001 | Murray |
| 6,264,560 B1 | 7/2001 | Goldberg et al. |
| 6,285,985 B1 | 9/2001 | Horstmann |
| 6,539,544 B2 | 3/2003 | Ebisawa |
| 6,601,041 B1 | 7/2003 | Brown et al. |
| 6,611,957 B2 | 8/2003 | Ebisawa |
| 6,615,039 B1 | 9/2003 | Eldering |
| 6,616,533 B1 | 9/2003 | Rashkovskiy |
| 6,625,578 B2 | 9/2003 | Spaur et al. |

(Continued)

OTHER PUBLICATIONS

Gordon, Paul. AD Watch. (Industry Trend or Event). Mar. 2001. New Media Age, p. 32.*

*Primary Examiner*—F. Zeender
*Assistant Examiner*—Fawaad Haider
(74) *Attorney, Agent, or Firm*—Perkins Coie LLP

(57) ABSTRACT

In one embodiment an online game advertising system provides an architecture for enabling the definition, sales, distribution, and management of interactive advertisements, sponsorships, and placements that appear within an online video game as part of the game experience or during idle load, wait, and pause screens. For example, in a race car game, when a driver pulls in for a pit stop, the engine oil brand that the game player may choose may be defined as locations for advertisements or product placements for real life engine oils and game publishers and advertisers may manage what specific advertisements to place in these locations.

2 Claims, 20 Drawing Sheets

U.S. PATENT DOCUMENTS

| | | |
|---|---|---|
| 6,640,336 B1 | 10/2003 | Ebisawa |
| 6,656,042 B2 | 12/2003 | Reiss et al. |
| 6,674,995 B1 | 1/2004 | Meyers et al. |
| 6,709,335 B2 | 3/2004 | Bates et al. |
| 6,712,702 B2 | 3/2004 | Goldberg et al. |
| 6,782,533 B2 | 8/2004 | Ebisawa |
| 6,790,142 B2 | 9/2004 | Okada et al. |
| 6,928,414 B1 | 8/2005 | Kim et al. |
| 2002/0004743 A1 | 1/2002 | Kutaragi et al. |
| 2002/0013174 A1 | 1/2002 | Murata |
| 2002/0040322 A1 | 4/2002 | Ebisawa |
| 2003/0083943 A1 | 5/2003 | Adams et al. |
| 2003/0101092 A1 | 5/2003 | Fuller et al. |
| 2003/0171985 A1 | 9/2003 | Prabhu et al. |
| 2003/0191690 A1 | 10/2003 | McIntyre et al. |
| 2004/0030595 A1 | 2/2004 | Park |
| 2004/0111317 A1 | 6/2004 | Ebisawa |
| 2004/0143495 A1 | 7/2004 | Koenig |
| 2004/0162759 A1 | 8/2004 | Willis |
| 2004/0186771 A1 | 9/2004 | Squires |

* cited by examiner

```
<?xml version="1.0" encoding="UTF-8" ?>
```
500 — `<CampaignListing xmlns:xsi="http://www.w3.org/2001/XMLSchema-instance"`
      `xsi:noNamespaceSchemaLocation="CampaignListing.xsd">`
510 — `<Campaign>`
    `<ID>2147483647</ID>`
520 — `<AdListing interval="30">`
    `- <Ad>`
      `<ID>2147483647</ID>`
      `<Type>image</Type>`
      `<Width>200</Width>`
      `<Height>200</Height>`
      `<Media>/advertising/media/2147483647.jpg</Media>`
    `</Ad>`
525 — `- <Ad>`
      `<ID>2147483648</ID>`
      `<Type>video</Type>`
      `<Width>200</Width>`
      `<Height>200</Height>`
      `<Media>/advertising/media/2147483648.jpg</Media>`
    `</Ad>`
    `- <Ad>`
      `<ID>2147483648</ID>`
      `<Type>image</Type>`
      `<Width>200</Width>`
      `<Height>200</Height>`
      `<Media>Penzoil engine go. Go with the best!</Media>`
    `</Ad>`
  `</AdListing>`
530 — `<Location>`
    `<ID>2147483647</ID>`
    `<Name>Engine Oil Pitstop</Name>`
  `</Location>`
  `</Campaign>`
`</CampaignListing>`

Fig. 7

Game Locations

Game Locations
All- A B C D E F G H K J L M N O P Q R S T U V W X Y Z    Showing: 1-4 of 200 | First | Prev | Next | Last

| New | Delete |

|   | Location ID | Type | Ad Types | Description | Dimensions | Thumbnail |
|---|---|---|---|---|---|---|
| ☐ | Billboard | 2D Area | Image, Video | Signage on a city wall. | 300 x 400 | billboard.gif |
| ☐ | Electronic Sign | 2D Area | Text | Stock ticker | 200 x 400 | esign.mov |
| ☐ | Engine Oil | 2D Area | Image | Stopping to refuel your car. | 200 x 200 | engineoil.mov |
| ☐ | Half time show | Load Screen | Video | Football game | 600 x 800 | halftime.mov |

---

Game Locations

New/Edit Game Location

| Save | Cancel |

Location Profile:

| Location ID: | |
| Description: | |
| Thumbnail Media File: | thumbNail.gif (5 K)    Upload New File... |

Properties

| Location Type: | 2D Area ▼ | 2D Area ▼ |
| Dimensions: | Width   Height   Pixels | 3D Area / Load/Pause Screen |
| Valid Advertisement Types: | ☐ Image  ☐ Video  ☐ Text | |
| Valid Game Component Types: | None ▼ | None ▼ |
| Max Game Component or Advertisement File Size: | 2056    K | All / List all unique game component types from db. |

---

Upload New File...

Upload New File

| Upload | Cancel |

Specify the media file on your local computer to upload to the server.
Valid file types include: gif, jpg, png, and mov.

| Media File: |    Browse |

---

Confirmation

Are you sure you want to delete the selected ad locations? Doing so will permanently remove them from the system.

| Yes | Cancel |

Fig. 9

Game Players

Game Players
All- A B C D E F G H K J L M N O P Q R S T U V W X Y Z      Showing: 1-4 of 200 | First | Prev | Next | Last

| New | Delete |

| | Game Player ID | Name | Phone Number | Email Address |
|---|---|---|---|---|
| ☐ | machoman | Randy Travis | 510-123-5685 | randy@country.com |
| ☐ | heman | Lili Tomlin | 615-656-5685 | ltomlin@earthlink.com |
| ☐ | shogun | Jennifer Connely | 566-859-5563 | jconn@uconn.edu |
| ☐ | whuppinbutt | George Bush | 555-555-7568 | pres@us.gov |

Game Players

New/Edit Game Player

| Save | Cancel |

Identification

| Game Player ID: | |
|---|---|
| Password: | |
| Confirm Password: | |
| Name: | First / Middle / Last |

Contact Information

| Home Address: | Street |
|---|---|
| | City / State / Zip/Postal / Country |
| Phone Numbers: | Home / Work / Mobile |
| Email Address: | |

Billing Information

| Billing Address: | ☐ Use Home Address |
|---|---|
| | Street |
| | City / State / Zip/Postal / Country |
| Credit Card Information: | Mastercard ▼  — Card Type / Account Number / Expiration (mm/yy) |

Fig. 10

Advertisements

Advertisements

All- A B C D E F G H K J L M N O P Q R S T U V W X Y Z      Showing: 1-4 of 200 | First | Prev | Next | Last

[ New ] [ Delete ]

| | Advertisment ID | Type | Dimensions | Description | Thumbnail |
|---|---|---|---|---|---|
| ☐ | Etrade 1 | Text | | Sign up for a free trial | |
| ☐ | ETrade 2 | Text | | 10 free trades | |
| ☐ | Pepsi 1 | Video | 300 x 400 | Nascar pitstop | pepsi1Thumb.gif |
| ☐ | Pepsi 2 | Image | 300 x 400 | Britney | pepsi2Thumb.gif |

---

Advertisements

New/Edit Advertisement

[ Save ] [ Cancel ]

Advertisment Profile:

| Advertisement ID: | |
|---|---|
| Description: | |

Properties

| Ad Type: | Image    ▼ | Image ▼ |
|---|---|---|
| Dimensions: | [Width] [Height] Pixels | Text / Video |
| Thumbnail Media File: | thumbNail.gif (5 K) | Upload New File... |
| Ad Media File: | ad.gif (50 K) | Upload New File... |
| Ad Text: | | |
| Email Click-through: | Pepsi Promotional.htm | Upload New File... |

---

Upload New File...

Upload New File

[ Upload ] [ Cancel ]

Specify the media file on your local computer to upload to the server.
Valid file types include: gif, jpg, png, and mov.

Media File: [_____] [Browse]

---

Confirmation

Are you sure you want to delete the selected advertisements? Doing so will permanently remove them from the system.

[ Yes ] [ Cancel ]

Fig. 11

Campaigns

Campaigns

| | Campaign ID | Description | Location |
|---|---|---|---|
| ☐ | characters | Vixens and Vikings | Electronic billboard |
| ☐ | equipment | Gadgets Galore | The latest spy gadgets. |
| ☐ | vehicles | Vehicle Outlet | Cars and trucks |
| ☐ | weapons | Shoot em up | Military grade weapons |

[New] [Delete]

Campaigns — New Campaign

- Campaign Settings
- Advertisements
- Display Rules

Campaign Settings

[Save] [Cancel]

Campaign Profile

| Campaign ID | |
|---|---|
| Description: | |
| Location: | Electronic billboard ▼ | Electronic billboard ▼ |

Show list of all locations

Campaigns — Stock Ticker

- Campaign Settings
- Advertisements
- Display Rules

Advertisements

[Add] [Remove]

| | Advertisment ID | Type | Dimensions | Description | Thumbnail |
|---|---|---|---|---|---|
| ☐ | Etrade 1 | Text | | Sign up for a free trial | |
| ☐ | ETrade 2 | Text | | 10 free trades | |

Confirmation

Are you sure you want to delete the selected campaign? Doing so will permanently remove them from the system.

[Yes] [Cancel]

Confirmation

Are you sure you want to remove the selected ads from the campaign?

[Yes] [Cancel]

Select Advertisements for the Stock Ticker Campaign

Select Advertisements

Showing: 2 ads that meet the filter criteria of the Electronic Billboard location of the Stock Ticker campaign.

[OK] [Cancel]

| | Advertisment ID | Type | Dimensions | Description | Thumbnail |
|---|---|---|---|---|---|
| ☑ | Etrade 1 | Text | | Sign up for a free trial | |
| ☑ | ETrade 2 | Text | | 10 free trades | |

Fig. 12

Type your email address below:

← A B C D E F G H I J K L M N O →

☐ Submit and resume game        ◎ Cancel and resume game

Fig. 16

Create/Edit Game Player Account

| Identification | |
|---|---|
| Game Player ID*: | [        ] ⇐ C D E F [G] H I J K L ⇒ |
| Password*: | [        ] |
| Confirm Password*: | [        ] |
| First Name*: | [        ] |
| Middle Name: | [        ] |
| Last Name*: | [        ] |

(X) Select   (□) Next   (△) Back   (○) Cancel

Create/Edit Game Player Account

| Contact Information: | |
|---|---|
| Email Address*: | [        ] ⇐ C D E F [G] H I J K L ⇒ |
| Home Phone: | [        ] |
| Street Address Line 1: | [        ] |
| Street Address Line 2: | [        ] |
| City: | [        ] |
| State: | [        ] |
| Zip/Postal Code: | [        ] |
| Country: | [        ] |

(X) Select   (□) Next   (△) Back   (○) Cancel

Fig. 19

Create/Edit Game Player Account

| Credit Card Information | |
|---|---|
| Credit Card Type*: | ⇐ Mastercard ⇒ |
| Account Number*: | [                    ] ⇐ C D E F [G] H I J K L ⇒ |
| Expiration Date (mm/dd/yyyy)*: | [                    ] |
| Name on Card*: | [                    ] |
| Billing Address*: | ⇐ Same as home ⇒ |
| Street Address 1*: | [                    ] |
| Street Address 2*: | [                    ] |
| City*: | [                    ] |
| State*: | [                    ] |
| Zip/Postal Code*: | [                    ] |
| Country*: | [                    ] |

(X) Select   (□) Finish   (△) Back   (○) Cancel

Game Player Account

Congratulations you have successfully created/edited your game player account.

Game Player ID: rasputin (X) Resume Game

Fig. 20

ONLINE GAME ADVERTISING SYSTEM

CROSS-REFERENCE TO RELATED APPLICATIONS

This is a continuation application of U.S. application Ser. No. 10/351,031, filed Jan. 24, 2003, which claims the benefit of U.S. application Ser. No. 10/317,371, filed Dec. 12, 2002.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to an online game advertising system, which in one embodiment serves as an architecture for enabling the definition, sales, distribution, and management of interactive advertisements, sponsorships, and placements that appear within an online video game as part of the game experience or during idle load, wait, and pause screens.

2. Discussion of Background

The primary business model of traditional offline video games is that game publishers generate revenues through the unit sales of games on the wholesale market. With the advent of pervasive Internet and broadband connectivity, video game publishers are adding online capabilities to their games in order to attract more game players and to explore new revenue models.

Existing online games allow players to play against other live players. Some of these games display banner advertisements that border the main viewable area of the screen in which the game is played. Game players often find these advertisements intrusive and annoying as they distract from the main focus of playing the game.

Video game play is an immersing experience in which game players interact with the characters, scenery, and challenges of the game itself and with other live persons who are also playing the game. Like television and movies, playing video games is a highly engaging experience that often requires the attention of its participants.

SUMMARY OF THE INVENTION

The present inventor has realized that advertising that occurs within a video game is less annoying to users if it occurs transparently without distracting the attention of the game player from the game itself. This transparency can be achieved by placing advertisements within an online video game as part of the game experience or during idle load, wait, and pause screens.

The present inventor has also realized the need to provide dynamic updates and real time management of various parts of programs in general and gaming systems in particular. In one embodiment, the present invention provides a game, comprising, a game playing program wherein at least one part of the game playing program is configured to be populated with an add-on component. The invention may also be practiced as a system, comprising, a game playing program wherein at least one part of the game playing program is configured to be populated with an add-on component, a remote server configured to store and serve at least one add-on component compatible with the game playing program, and an interface coupled to the game playing program, the interface configured to interact with the remote server and facilitate importation of an add-on component from the remote server into said at least one part of the game playing program.

In another embodiment, the invention is a server configured to manage an area within a program hosted on a user computer, wherein the server is remotely located from the user computer.

The invention may also be practiced as one or more methods, for example, a method of on-line advertising, comprising the steps of, registering a user of a gaming system, uploading an advertisement to a game program of the registered user, wherein the game program is configured to accept and install the advertisement as an add-on game component, and managing activities of the user during interactions of the user with the uploaded add-on component. As another example, the invention is a method of producing advertisements for games, comprising the steps of, preparing an executable program component capable of being imported into a game program and configured to interact with a game being played by a user of the game program.

In yet other embodiments, the invention is a component comprising, a software module configured to be imported into a commercially available gaming program, wherein said software module is configured to implement an additional feature of the gaming program, the additional feature comprising at least one of an advertisement sponsorship, placement, coupon, gift certificate, announcement, text, graphics, video, and objects used by the game program.

These and other embodiments and features of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a printout example of XML code of a campaign advertisement listing according to an embodiment of the present invention;

FIG. 9 is a screenshot example of using the Game Manager Management Console to register game locations according to an embodiment of the present invention;

FIG. 10 is a screenshot example of how a game player is defined using the Game Manager Management Console according to an embodiment of the present invention;

FIG. 11 is a screenshot example of how an advertisement is defined using the Advertising Manager Management Console according to an embodiment of the present invention;

FIG. 12 is a screenshot example of how an advertisement campaign is defined using the Advertising Manager Management Console according to an embodiment of the present invention;

FIG. 16 is a screenshot example of how a game player may request to be sent additional information regarding the ad through email according to an embodiment of the present invention;

FIG. 19 is a screenshot example of how a game player may define a user account for him/herself through the use of the game according to one embodiment of the present invention; and FIG. 20 is a screenshot example of how a game player may define a credit card that is tied to one's user account for purchases made within the game according to one embodiment of the present invention.

DESCRIPTION OF THE PREFERRED EMBODIMENTS

Figure 1:
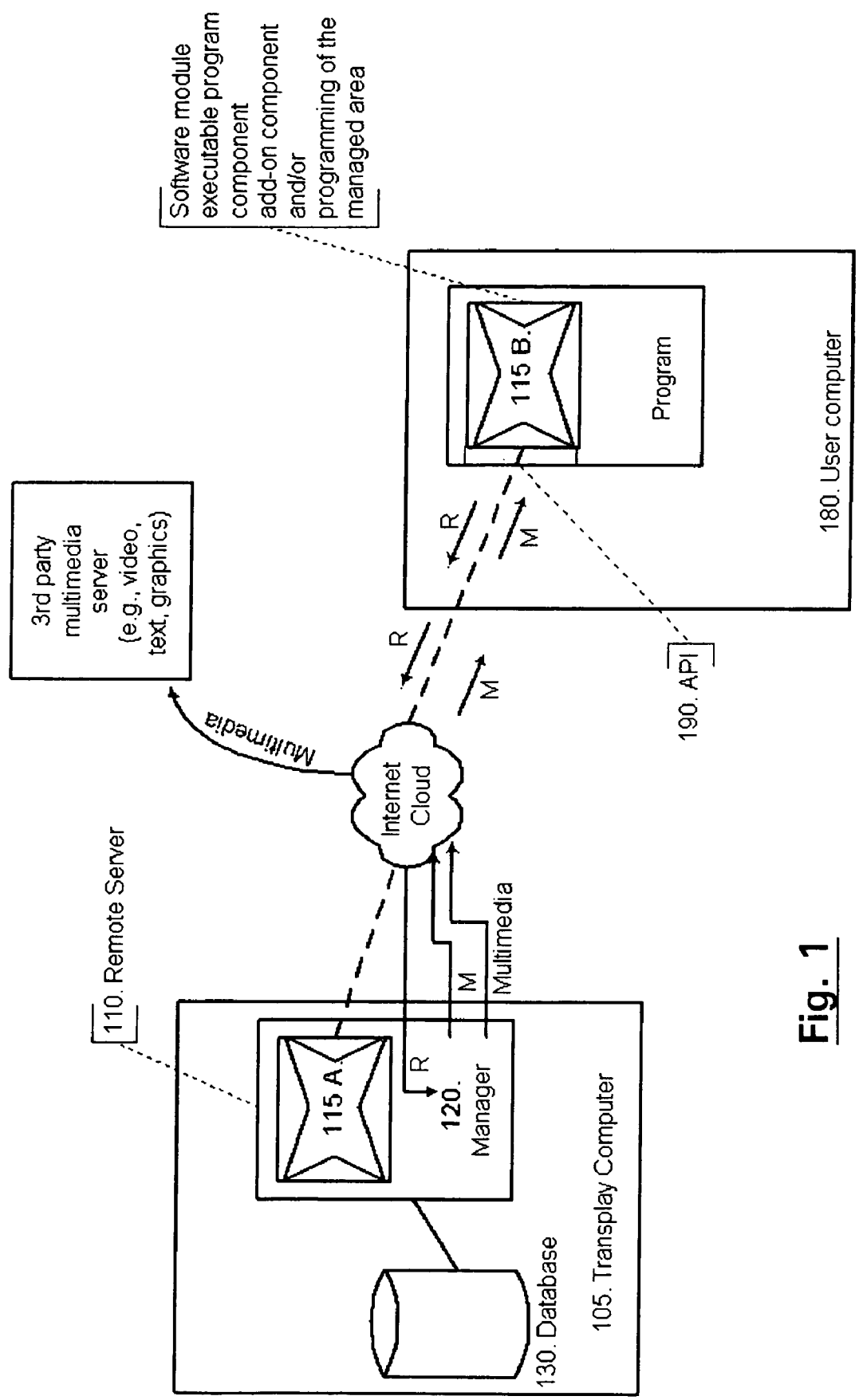
FIG. 1 is a block diagram of a gaming system according to an embodiment of the present invention.

Referring now to the drawings, wherein like reference numerals designate identical or corresponding parts, and more particularly to FIG. 1 thereof, there is illustrated a drawing of a gaming system according to an embodiment of the present invention. A remote server stores an add-on component 115A that is configured to be uploaded and installed in a program 185 on a user computer 180. The program 185 includes an Application Programming Interface (API) 190 that allows the program 185 to communicate with the remote server 110 through a standard network or Internet connection hosted on the user computer 180. The add-on component 115A (initially stored in database 130 or other storage device) is, for example, served to the user computer 180 by the remote server 110 via an Internet connection, and installed in the program 185 via the API. As shown in FIG. 1, add-on component 115A has been served to user computer 180, installed by API 190, and is shown residing within program 185 as add-on component 115B.

The add-on component is, for example, an executable program component, interpretable source code, or other software module, that, when executing within the program 185, implements a feature or otherwise adds value to the program 185. The program 185 may be any type of computer program, including any of games, business programs, entertainment programs, etc.

A publisher of program 185 releases program 185 with facilities or other hooks (e.g., programming techniques, API, interface, etc.) in the program 185 that are needed to accept additional new components (e.g., game pieces, area updates, etc.). The API 190 accepts incoming new components from an Internet or other connection and provides the incoming component to the program in a manner needed by the program to accept additional programming. For example, the API saves a new component in an appropriate directory that is accessible to the program, or invokes a specific routine provided by the program to install the component.

Figure 2:
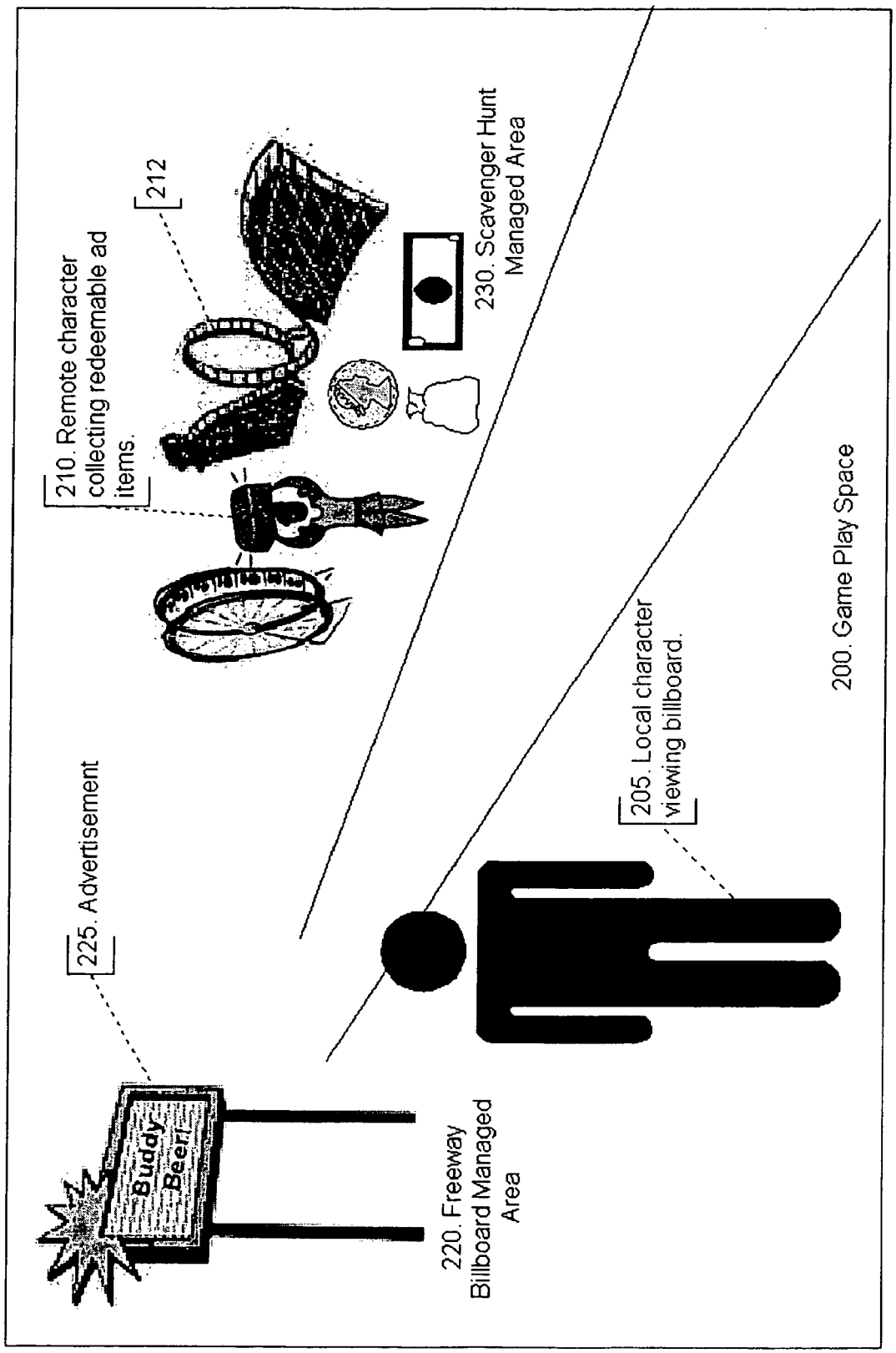
FIG. 2 is a screenshot of a program play space output according to an embodiment of the present invention.

We now turn to a specific example in which the program 185 is a game playing program of the type in which users select characters or other icons and then control movement of the selected character or icon via joystick or other input devices attached to the user computer 180. An example output play space 200 of an example game playing program as shown in FIG. 2. The game includes characters 205 and 210 that represent users of the game. In one embodiment, the game is an on-line game, and, for example, character 210 represents a remote on-line user and character 205 represents a local user of user computer 180.

In this example, the add-on component is configured to provide a billboard, and the add-on component includes all the data and programming to place "Freeway Billboard" 220 in the game as a managed area. The program 185 has been programmed to have facilities to allow updates to a portion of the game playing space, and upon installation of the add-on component 115B, the "Freeway Billboard" appears in the game playing space. As illustrated in this example, a part of the program 185 is updated with add-on component 115B (e.g., updates programming of the game), and the programs output, or play space, is also updated with an additional feature (e.g., "Freeway Billboard" 220) provided by the add-on component.

In one embodiment, "Freeway Billboard" 220 is a virtual advertisement display that cycles through various video and animated advertisements (FIG. 2, Advertisement 225). The advertisements may be selected by local and/or remote users based on interaction of their respective characters with the virtual billboard. When selecting the billboard, the interacting user may further have the option to enter his/her own email or home address to request additional information regarding the product being advertised. Moreover, the user may have the option to immediately purchase the product being advertised. Payment is made, for example, via real cash or credit monetary transactions or via points, health, or other value accumulated through play of the game. The characters may select the virtual billboard by pointing or looking at the billboard or other means of selection provided by the add-on component and use various ways to select advertisements from the virtual billboard. In one embodiment, once selecting the virtual billboard, a virtual "advertainment" experience is provided, where the game player's character enter a special game level, room, or area and may interact directly with animated characters, objects, and videos that represent the various products being advertised. In another embodiment, a traditional video-based, TV-like advertisement is provided and in another embodiment a traditional image-based, web-like advertisement is provided. In one embodiment, game play is suspended during "viewing the advertisement." In other embodiments, game play continues while the characters view the advertisement—thus, while viewing the billboard or walking through the virtual "advertainment" area, a player in a shoot-em-up style game may be in peril of getting shot. In one embodiment, a motif of the add-on component 115B is programmed to match a motif of the program being updated (e.g., in an old west style game, the billboard appears as a large ranch sign—an O.K. Corral style sign, or, in technology related games, the billboard appears in a futuristic motif).

In one embodiment, a virtual billboard within a specific game playing program will advertise equipment, ammo, characters, etc that are compatible with the game playing program. Thus, upon selection of the billboard advertisement, the game character will enter a virtual store, and will be able to "purchase" his own game equipment, such as a particular model of a gun (pistol, rifle, machine gun, etc.), and character 210 may, for example, if the virtual store allows trading, trade up from a handgun to a more sophisticated weapon.

In another embodiment, a virtual billboard within a specific game playing program will advertise real world products such as clothing, sports gear, movie tickets, food products, etc. Upon selection of the billboard advertisement, the game character will enter a virtual store in which he/she may purchase the advertised product or enter contact information to be sent additional information regarding the advertised product.

Game advertisements are generally produced by the game publishers or advertisers to which the game publisher has sold the ad locations and opportunities. The publishers or advertisers may require game players to match a preferred profile or to fulfill certain game requirements before game players may view specific advertisements or promotions. For example, a player must have accumulated a certain amount of points or playing time before being allowed to view an advertisement for a more sophisticated weapon to be used within the game or a player must 21 years or older to be allowed to view the advertisement that contains a free coupon for a six pack of beer. Such requirements are enforced via encrypted keys or other secure methods to check a users qualification before displaying of certain advertisements. Such checks may be made, for example, by the remote server 110, or the program 185, and the necessary qualifications are, for example, stored in metadata in the database and are retrievable by either the remote server or program. Other advertisements are available to all players willing to view them. Some advertised products are available for "purchase" using points, but others require the use of real currency.

Advertisements displayed within the virtual billboard are viewed according to rules established by either the advertisers or game publishers. The rules are accessible and enforced by either the remote server or the program 185. Example rules include, for example, that advertisements may only be viewed during specified time intervals, according to fluctuating supply levels, or determined by a sequence of actions taken by the game character in relationship to the advertisement. For example, a beer ad may be specified to viewed in the evening, whereas a coffee ad is displayed in the morning and an ad displaying a coupon for a free movie ticket may be displayed only to the first 1000 game players who select the advertisement. In another example, an advertisement containing a coupon for a free movie ticket is only displayed if a game player directs his character to jump three times around the circumference of the billboard displaying the ad or throws a tomato at the center of the billboard.

In one embodiment, an on-line connection between the add-on component and the remote server provides up to date information on the display schedule and stock availability of specified advertisements. The remote server 110 includes a manager program 120 that is configured to manage advertisement display schedules and rules presented in the virtual billboard. The manager program 120 includes all the necessary programming to enforce game publisher rules about the display and selection of advertisements within the game (e.g., evaluation and/or production of keys needed to insure proper distribution of the advertisements), and maintains all necessary hierarchies or other organization needed to present the advertisements available for viewing in an efficient manner. Messages, such as management message (M) are sent form the manager, over a network (e.g., Internet), to the user computer, through the API 190, to the add-on component 115B with the latest information needed to properly implement the feature of the add-on component (e.g., latest advertisements, product promotions, display schedules and criteria). Relevant information about advertisement selection or purchases or other aspects related to activities of the virtual billboard (or other feature) are sent back, as needed, to the manager via response (R) messages. In another example, the add-on component is a can, and the can appears in the video game as a soda can if the registered player is under age, and as a beer can if the user is not under age. The age requirement being a rule, the can being an add-on component inserted into the game, and the can label (beer/soda, etc) being advertising content specified by advertisers to the remote server and then controlled by the remote server, via management messages, as to when it is allowed to appear as a beer, soda, or other product.

The manager 120 is also configured to coordinate purchases via credit card, bank accounts, or other currency sources by sending billing information to any available 3rd party credit or bill paying service (e.g., VISA, PayPal, etc.). Moreover, the manager 120 is also configured to coordinate responses back to the user computer add-on component to coordinate interaction with a multimedia server that correctly samples, filters, resizes, and returns multimedia assets such as video, images, and audio files that represent the advertisements being displayed to the user. For example, a soda can object may be resized from a game object handled by a user in the foreground or in the background (perspective resizing) of the video game play space or resized for use in a billboard.

Although only one add-on component is shown in FIG. 1, the program 185 may be configured to accept multiple add-on components, and remote server 110 is preferably configured to serve many different types of add-on components. In addition, add-on component 115A/B is not limited to implementing a single feature in the program 185, and may also be programmed to implement multiple features. A "Scavenger Hunt" area 230 is also shown in the example game playing space of FIG. 2. Like the "Freeway Billboard", the Scavenger Hunt area is available for selection and in game characters may be directed to navigate around and through the area to collect, for example, coins, money, or treasure that represent gift certificates, any one or more of which are add-on components, that are again, for example, redeemable for real life products such as electronics, clothing, or movie tickets. The present invention does not place constraints on how the add-on component is implemented in the game. In some embodiments though, the present invention evaluates metadata and requires certain rules be fulfilled before download of the add-on component to the user computer or enablement of one or more features of the add-on component (e.g., download or enablement via a message M). The message M may contain any of an add on component, instructions to enable features, requests of the user computer, or other messages (e.g., data, status, etc.). Information needed from the user's computer to make decisions as to downloading of components or enablement of features is retrieved, for example, via a message (R) sent from the user's computer to the remote computer (e.g., automatically sent to the remote server on a schedule or as the result of an event, or sent in response to an inquiry message (M) from the remote computer).

In some embodiments, the update area (e.g., Freeway Billboard area 220) is required to have a similar motif as the program, or at least be related to the program (e.g., advertise characters or equipment, etc. that is usable with or at least related to the game). However, in other embodiments, the updated area may not be related at all to the game being played. For example, instead of selling game equipment, freeway billboard area 220 might be an advertisement for an actual auto dealership selling full sized automobiles. The Freeway Billboard then, for example, once selected links to an on-line store for Ford, Chevy, or Ferrari automobiles. In one embodiment, special gaming style programming is utilized to implement the car sales area. In another embodiment, the car sales area is a link that brings up a traditional browser into the game program that the user can view a car sales web site (the traditional browser may have a skin or other motif similar to a motif of the game program; motif of the online stores or other areas/locations within the game play space may also be similarly updated using skins developed for add-on components).

Figure 14:
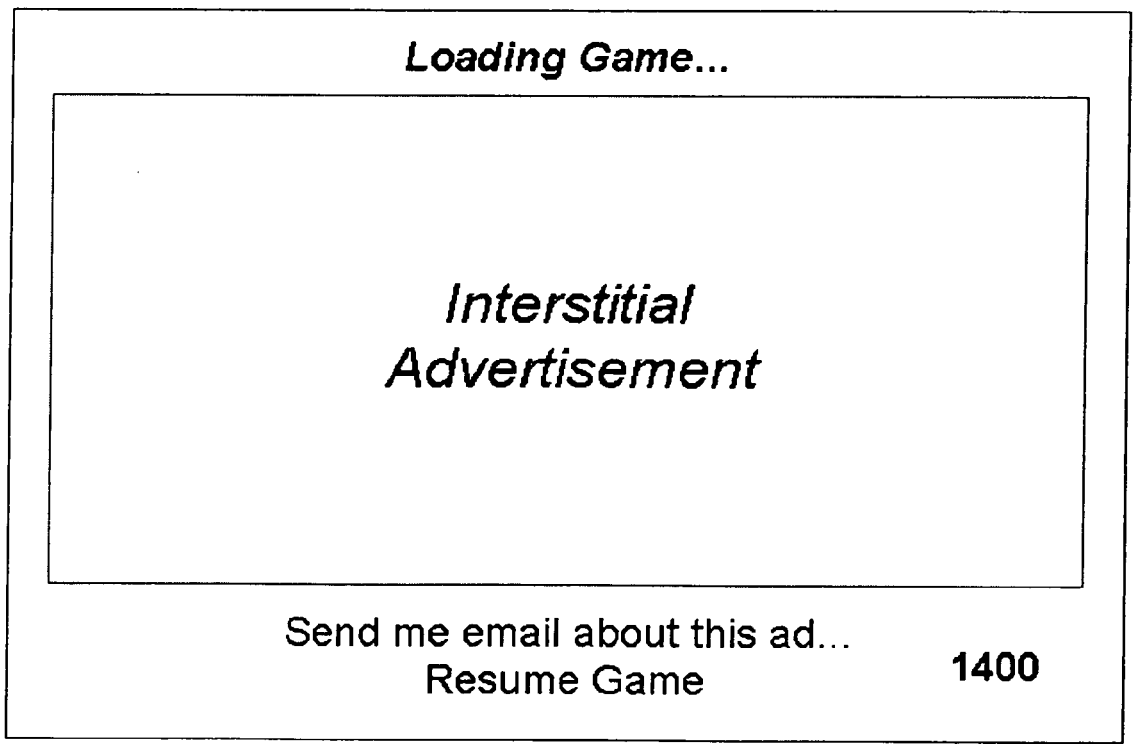
FIG. 14 is a screenshot example of how an advertisement from a load screen within a game is viewed according to an embodiment of the present invention.
Figure 15:
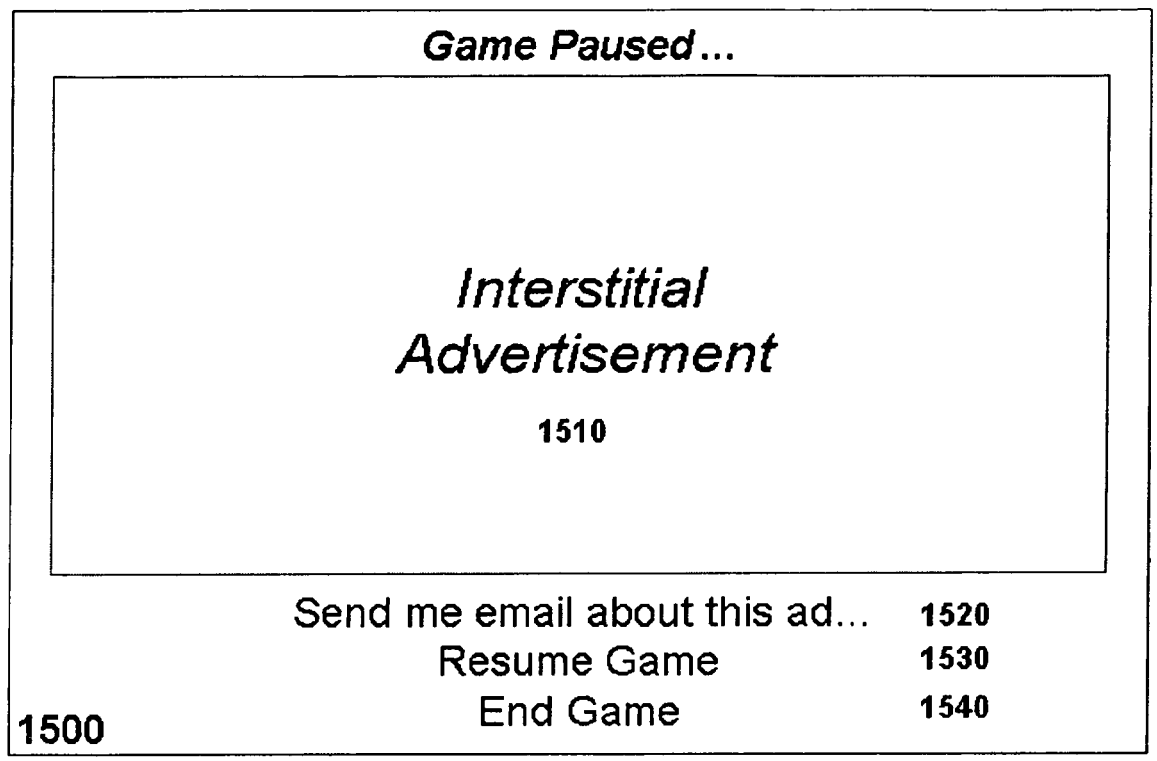
FIG. 15 is a screenshot example of how an advertisement from a pause screen within a game is viewed according to an embodiment of the present invention.

In addition, in one embodiment of the invention, advertisement screens may be displayed during idle load time that typically occurs when the game is loading into memory. Load screens typically include application code and graphics representing a game play space that may represent, for example, a scene such as that depicted in FIG. 2. The same space and resources are converted to advertising. An example advertisement screen 1400 is illustrated in FIG. 14. The advertising to be presented is provided from an add-on component, or a message to an existing component in the user's game program. In another embodiment, advertisements may be shown when a game player pauses game play by selecting a pause option provided by the game (e.g., see pause screen 1500, FIG. 15). When viewing advertisements presented in a load or pause screen, the game player may interact with the advertisement directly and may choose to resume the game after the game space or sequence has completed loading or upon selecting to unpause the game.

Although additional aspects and features of the invention are discussed herein below, in several broad embodiments, the present invention includes: an add-on component served from a remote server that is installed (or imported) into a program of a user computer; an add-on component that implements one or more new features to a program; a remote server that manages a part of a program remotely (e.g., notifying a virtual billboard in a program about advertisement availability and/or instructing the billboard to display a specific advertisement), in which the part may be either an add-on component or a permanent part of the program. Management by the remote server may also be configured to insure integrity of the display and use of the add-on components via the use of keys and other privacy facilities that make those components, or aspects of the components, inoperable unless certain conditions are met. For example, in one embodiment advertisers that upload content to the remote server are also required to enter a key (e.g., an encrypted key) that indicates to the remote server a length of time that the content is valid and a frequency of use of the content. Keys may be provided to extend the life of the content or change the frequency of use (e.g., license is fully paid).

Thus, in one embodiment, the invention is a game, comprising, a game playing program wherein at least one part of the game playing program is configured to be populated with an add-on component, and the add-on component is populated from a remote source. The add-on component may be an advertisement, a object used in the game, or a display area in which to show advertisements.

In one embodiment, the game playing program includes a character that represents a player utilizing the game playing program, the add-on component comprises a gaming style program that implements an advertisement billboard paradigm, the game playing program is configured to allow the player to direct the player's representative character to select the advertisement billboard, and the add-on component is configured to allow the character to select and purchase items advertised within the billboard. In another embodiment, the add-on component comprises a gaming style program that implements scavenger hunt collection paradigm, in which the game playing program is configured to allow the player to direct the player's representative character to treasures such as coins, money, jewels, power-ups, etc, that represent certificates that may be redeemed for advertised products or services. However, it should be understood that any number of gaming paradigms may be implemented using the processes and techniques of the present invention and those examples provided herein do not limit the type or scope of possible implementations. In fact, the present invention is not limited to gaming programs and may be applied to any type of computer product.

The present invention is also a system, comprising, for example, a game playing program wherein at least one part of the game playing program (e.g., 185) is configured to be populated with an add-on component, a remote server (e.g., 110) configured to store and serve at least one add-on component (e.g., 115A) compatible with the game playing program, and an interface (e.g., 190) coupled to the game playing program, the interface being configured to interact with the remote server and facilitate importation of an add-on component from the remote server into said at least one part of the game playing program. The importation of the add-on component (e.g., 115B) may be a dynamic update (e.g., during game play) of contents of at least one of an area and location (e.g., 220) within the game playing program. The add-on component may be, for example, an advertisement (e.g., any of an ad sponsorship, product placement, gift certificate, video, text, graphic, game object, or other component) utilized by the game playing program. In another example, the add-on component may define a virtual billboard (e.g., Freeway Billboard 220) configured to at least one of display, distribute, advertise, or promote products and services and link to an online auction or store that is accessible as part of the game playing program and at which game players may purchase the advertised products or services.

In one embodiment, the remote server is further configured to register users of the system, transmit binary application code of the add-on component, and generate and transmit a license key that controls use of the add-on component. For example, in one embodiment, the license key is produced by a license key program co-located in the remote server. The license key is provided based on content and payments ($ or other remuneration) provided by an advertiser and/or game publisher. The license key is transmitted in a message M to the user computer (e.g., to program 115B via API 190) where it enables previously transmitted add-on components and/or content.

The server includes facilities to manage an area within a program hosted on a user computer, wherein the server is remotely located from the user computer. In one embodiment, the server is further configured to define advertisement campaigns such that any of the virtual billboards within a game may be dynamically updated within the program according to specified display rules (The display rules may, for example be transmitted in a message M to the program 115B for implementation. In other embodiments, the display rules are implemented by the remote server via commands sent in messages (m) to the program 115B).

The server may also be further configured to facilitate fulfillment of purchase transactions incurred by a game player in a virtual store that is linked to from a managed area, and bill the game player's purchases via interaction with a third party billing system to charge the game player and credit a selling party, and, for example, persist a billing record of fulfilled purchase transactions by saving relevant purchase information into a centralized storage device (e.g., to database 130).

Figure 17:
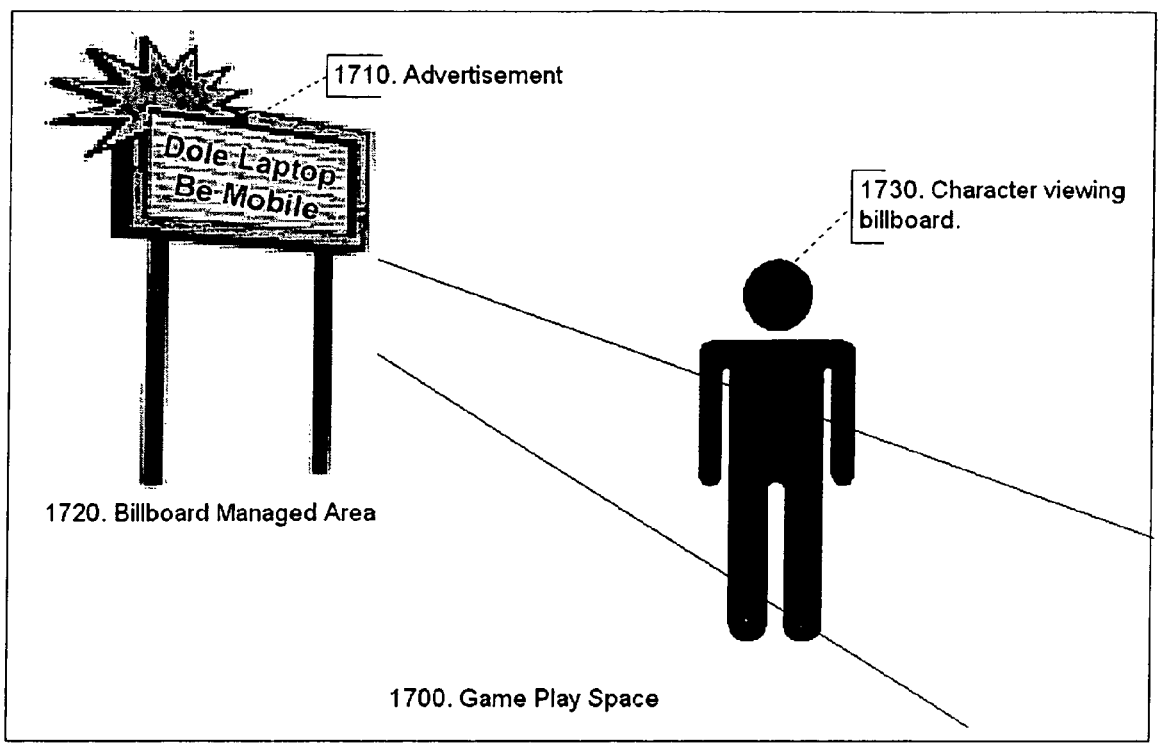
FIG. 17 is a screenshot example of how an advertisement placement within a game is viewed according to an embodiment of the present invention.

The server may also be configured to facilitate the dynamic resizing, sampling, or editing or a multimedia image, audio, video, or text file that represents the add on component to be displayed within the managed area through interaction with a third party multimedia server. This encompasses all types of matching needed to place content provided by advertisers in spaces within the game playing program and/or a component installed in the game playing program. The spaces are, for example, software modules, objects, or specifically defined areas programmed into the game playing program and configured to accept the content and use the content in the play space or virtual world of the game playing environment. FIG. 17 is a screen shot of an example play space or virtual world 1700. An advertising billboard 1710 is a space provided for advertising (e.g., advertising content 1720).

The server may also be configured to identify areas within the program that are capable of being dynamically updated from a remote source (e.g., advertising billboard 1710, game object 212, etc.) and then dynamically update the content of at least one of the identified areas. The identified areas comprise, for example, at least one of a two dimensional and three dimensional space, or an object within an output of the game program.

Figure 18:
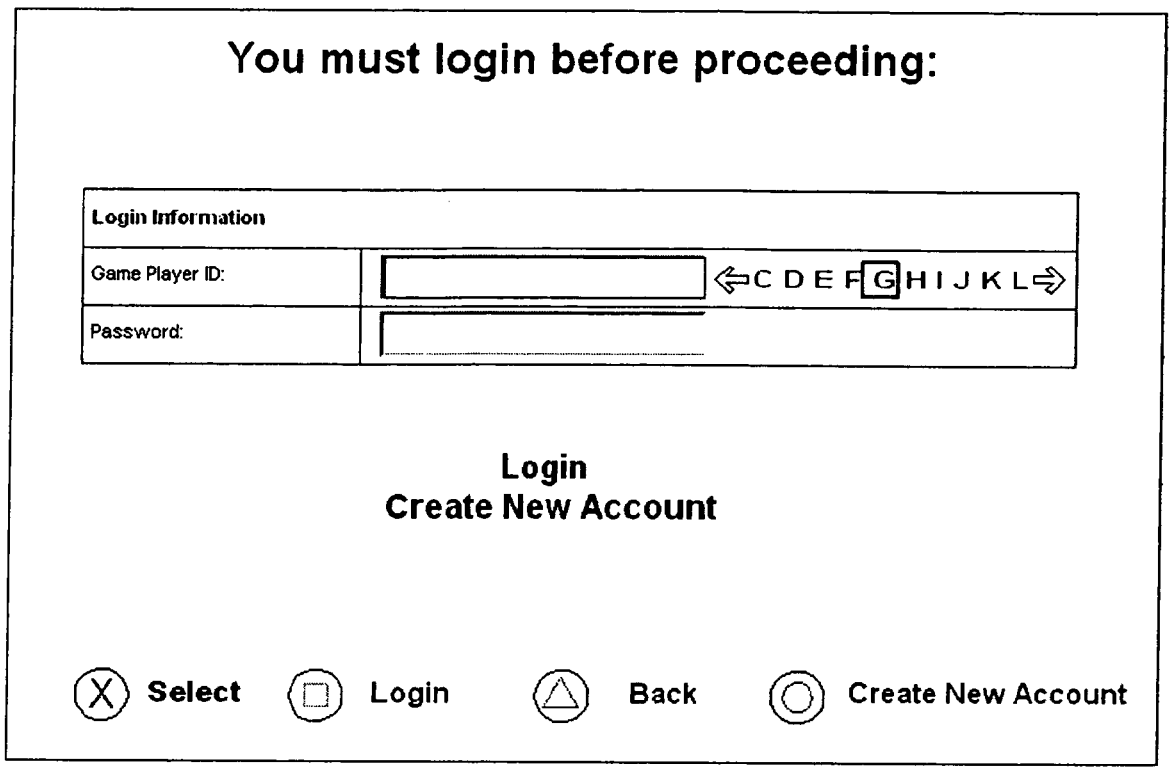
FIG. 18 is a screenshot example of how a game player is prompted with a login screen when attempting to view a secured or personal area such as requesting product information or gift certificates that are mailed to the game player's home address.

On-line advertising includes a method, comprising the steps of, uploading an add-on component to a game program of the registered user, wherein the game program is configured to accept and install the add-on component, and managing activities of the user during interactions of the user with the uploaded add-on component. Preferably, the users are required to login to the system as shown in FIG. 18 and are registered with the system which includes, for example, ID information, and credit card or other information used to bill the user for services and/or products offered by any one or more features provided by the present invention. The game user's account is created and/or updated using, for example, a registration window such as that shown in FIGS. 19 and 20. Managing activities includes, for example, managing advertisements and their respective multimedia assets (content), managing various locations within a game in which advertisements may display, and managing a hierarchical organization and grouping of related advertisements within an ad campaign. A campaign in one embodiment is a grouping of related advertisements that are scheduled or configured to display in a common location during a common time period according to a set of defined guidelines as set forth in the succeeding paragraphs. The present invention provides a unique method for grouping advertisements into campaigns such as, in one embodiment, is shown in FIG. 12.

Managing also includes the steps of defining a set of guidelines (or rules) governing a advertisements display, distribution, or behavior within a advertisement location (e.g., billboard space), and enforcing the guidelines through management activities that, for example, include use of any metadata, binary files, and/or license keys of the add-on component according to the set of guidelines governing the uploaded component (e.g., as provided by game publishers).

The invention also includes a method of producing add-on components for games, comprising, preparing an executable program component capable of being imported into a game program and configured to interact with a game being played by a user of the game program. The executable program component may be programmed or otherwise configured to implement a virtual billboard or scavenger hunt area in which game players may participate. Participating may include, for example, selecting or collecting items being advertised, and request more information regarding the advertised items, purchase the advertised items, or redeem the collected advertised items for gift certificates, products, or services.

An API (e.g., 190) is utilized that allows the program (e.g., a game) to dynamically update the contents of an area/location within the program from a remote source. This is particularly applicable to "advertising" intended to take place, for example, in a game, such that the "area/location" being updated is a virtual "billboard" and the "contents" are real world products such as clothing, food, services, etc that are for sale. "Freeway Billboard" 200, discussed previously, is one example. The contents of the billboard 200 may change on a predetermined schedule (e.g., every 30 seconds), or based upon gaming actions (e.g., billboard changes after a certain weapon is fired). Another example is such that the "area/location" being updated is a pause screen and the "content" being advertised are movie tickets. For example, when a game player discovers the secret entrance of a hidden castle, the phone rings and he pauses the game to take the call. When the game player comes back to the game, a movie trailer advertising (e.g., displayed in interstitial advertisement area 1510) that the third installment of *The Lord of The Rings* is opening this Friday. After clicking on a link (which, for example, may also be the interstitial advertisement area 1510), to view local show times and purchase tickets online, the game player unpauses his game (resume game button 1530) to continue his quest to save the world.

Another example is such that the updated "area/location" within the game is a "pit stop" within a racing car game and the "content" being updated is a game object representing engine oil. When stopping for a pit stop, the game player may choose the brand of engine oil that he prefers to use in real life and within the game. Selecting a specific brand of engine oil also allows the game player to click on a special pop-up to be sent a coupon for $1 off the advertised brand of engine oil (e.g., via the user's registered e-mail address). Alternatively, a pop-up allows the user to enter his e-mail address to receive the coupon or other announcement.

Yet another of example is that the updated "area/location" within the game is a "secret bonus level" and the updated "content" is coupons for advertised products. In this example, a game player is playing a cartoon character driven game with secret bonus rounds where game players must navigate the main character through a maze to collect product coupons and gift certificates of differing values and denominations. In order to collect the coupons, for example, the game player must jump on or hit barrels and blocks that are marked with highlighted arrows. The coupons in this scenario are advertisements for real products and are hidden within specified locations and objects within the bonus round environment. The coupons and gift certificates are preferably content downloaded to the gaming user's computer and managed by the remote computer. Alternatively, the content is managed by programming on the user's computer according to the rules provided to the user's computer by the remote computer. After completion of the bonus round, the game player may be presented with the option of viewing the specific discounts and gift certificates for real world products that he/she has collected during the bonus round.

The "area/location" may also be a feature that is a non-advertising scenario as well. For example, an "area/location" may also be defined in the game as a treasure chest and the "contents" of the treasure chest may be coins, jewels, weapons, potions, etc. In one embodiment, the contents are dynamically determined by making a request (or response to a remote server management message) to a remote server that manages and maintains the catalog of items. For example, when a player nears a room where a treasure chest is to be located, programming on the user's computer makes a request to the remote computer that requests a treasure chest and/or contents of the treasure chest. Similar requests may be used to request advertising content for any of the other embodiments discusses herein.

Furthermore the "remote server," on a Transplay Platform (e.g., 105), may execute code at the time of the request to determine what specific item should display within the treasure chest depending upon "game rules." The "game rules" are set up as an administrative process by the game developer or publisher through, for example, a web based management console. Examples of such rules are show jewels if the main character opening the chest is a woman, show life potion if the main character's health is less than 50%, or randomly etc. Another example of this behavior is defining a building as a location within a game (e.g., an ammo shop, museum, gas station, fast food, etc.), different bad guys that run out of the building shooting at the main character as the content, and game rules such as run out only if the main character has rescued the President and is at risk of escaping. Any game rules for any particular game or group of games may be utilized.

We now provide a more detailed look at the various features of the present invention. In one embodiment, the present invention describes an online game advertising system that provides game developers and publishers with the ability to define, sell, distribute, and manage advertisements, sponsorships, and placements that appear within the game as part of the game experience or during idle load, wait, and pause screens. The present invention allows game developers to define locations within their games in which advertisements may appear. Through the use of a Web based management console, game publishers and advertisers may create and schedule new image, audio, text, or video based advertisements to display within available game locations as defined by the game developer.

Define advertisement locations and objects: In one embodiment, the present invention provides a method for defining advertisement locations and objects. In this context, the term "defining" refers to a unique method of specifying the areas or objects within a game in which advertisements may display (e.g., game publishers provide information to the remote server that specifies the areas and objects for a game or set of games that the remote server will interact with).

Moreover, the term "defining" also refers to the unique method of restricting the types of advertisements that may display within a given area or object within a game (e.g., game publishers specify content and format of content that is useable and/or appropriate for the specified areas and objects). Examples of such restrictions include but are not limited to the multimedia type (image, video, or audio), dimensions, file size, and duration of an advertisement. "Areas" in this context refers to any region mapped to any two or three-dimensional coordinate system bounded by the spatial dimensions of the described space. Moreover, "objects" in this context refers to the representation of any game component such as but not limited to a game character, weapon, device, equipment, landmark, or scenery that may contain areas in which advertisements may appear. This is achieved through the use of Game Service and Game Location APIs (Application Programming Interface) such as those depicted in FIG. 6, Items 105 and 150 and which provide a programming interface to define advertisement locations and objects within the code of a game written for any proprietary gaming console or client such as, but not limited to, Sony Playstation 2, Microsoft Xbox, Nintendo GameCube, any wireless or handheld game client, or a personal computer. Preferably, the APIs are standardized across different gaming environments, but several different location APIs at the remote computer could be utilized to accommodate different environments.

Figure 3:
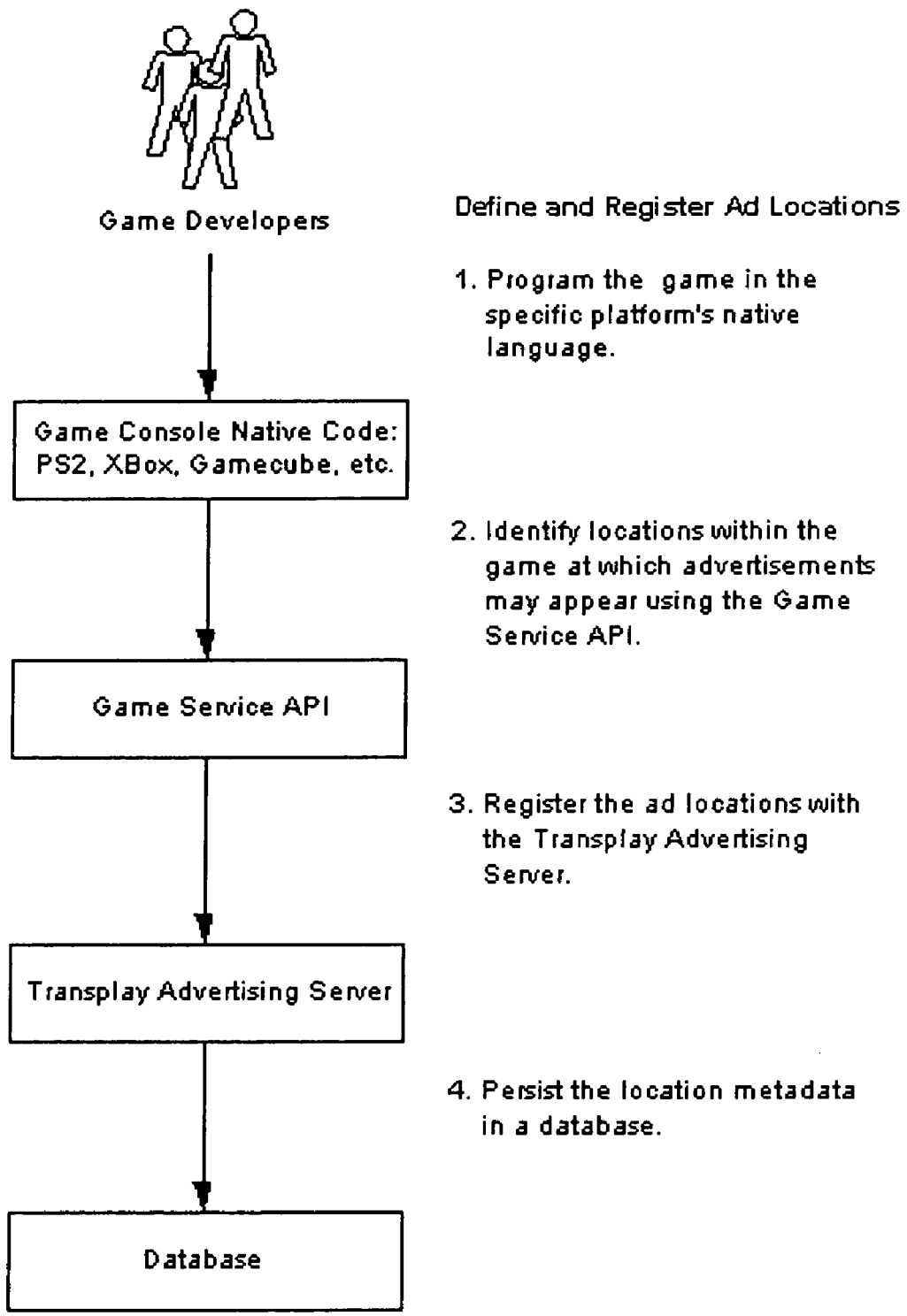
FIG. 3 is a flowchart example of how game locations are defined and registered according to an embodiment of the present invention.

Register advertisement locations and objects: In one embodiment, the present invention provides a method for registering advertisement locations and objects with a game advertising server. The term "registering" in this context means the process of specifying the advertisement locations and objects that have been defined within a game by a game developer using the method described above. In one embodiment, this may be achieved manually through the use of user interface provided by a web based management console application (e.g., the process illustrated in FIG. 3, steps 1-4 performed by Advertising Manager 100 (FIG. 6) and/or, for example, using the screens illustrated in FIG. 9). In another embodiment, registration may be achieved automatically through an asynchronous import of an XML document containing a listing of all of the advertisement locations and objects within a game that are to be registered with the game advertising server.

Figure 4:
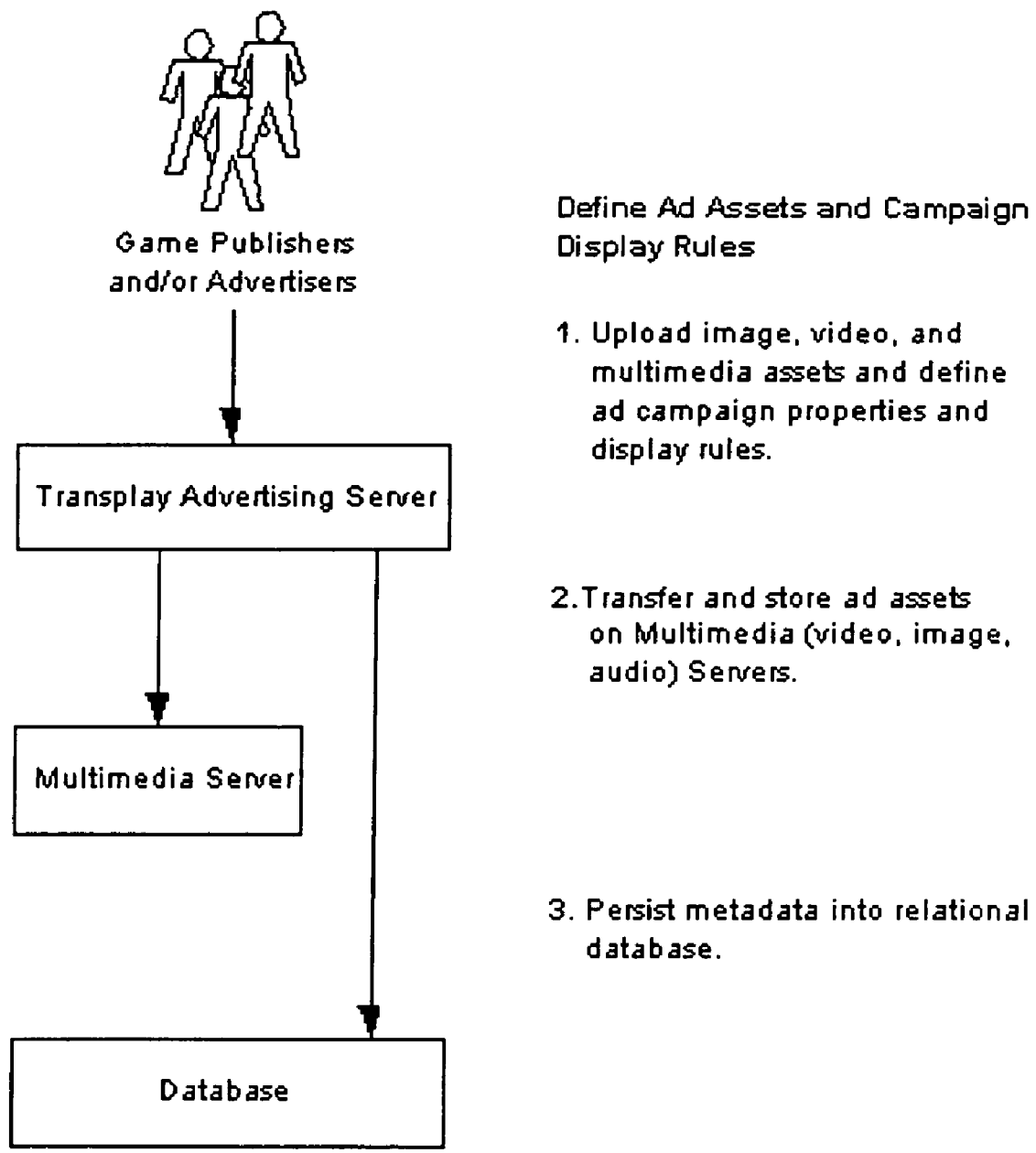
FIG. 4 is a flowchart example of how advertisement assets, campaigns, and display rules are defined according to an embodiment of the present invention.
Figure 5:
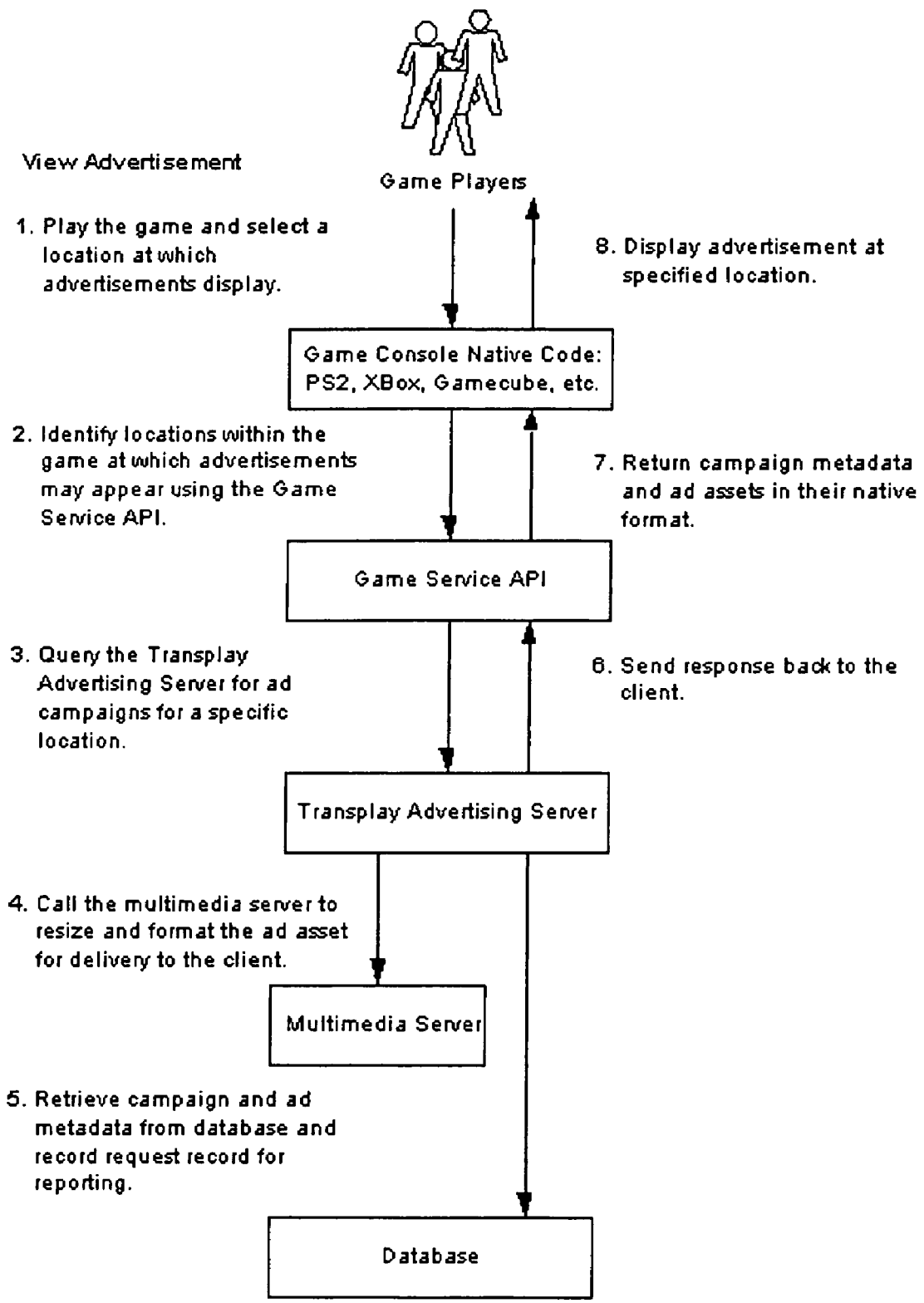
FIG. 5 is a flowchart example of how advertisements are viewed by a game player within a game according to an embodiment of the present invention.

Define campaign and display rules and register advertisement assets: In one embodiment, the present invention provides a method for defining campaign and display rules and registering advertisement assets within an online game advertising server through the use of a user interface provided by a web based management console application such as the method depicted in FIG. 4, which may be implemented, for example, on a server (e.g., see FIG. 6, Item 100). For example, as shown in FIG. 4, one may use a web based management console to image, video, or multimedia assets to a remote server (e.g. FIG. 6, Item 100) and enter various information describing such assets in association with one or more advertisements or ad campaigns. Moreover, the remote server would then transfer the multimedia media assets to a Multimedia Server (e.g. FIG. 6, Item 140) and store the descriptive metadata into a relational database (e.g. FIG. 6, Item 130). The term "campaign" refers to a collection of advertisements. The term "advertising asset" refers to a multimedia object such as an image, audio, or video file that represents the content of the advertisement to be displayed. The term "register" in this context refers to the unique method of specifying a set of metadata associated with an advertising asset that may include properties such as but not limited to the asset's name, description, media type, file size, dimensions, and URL or path to locate the asset. The term "display rules" refers to a set of guidelines governing at what time and at what locations within a game a campaign should be displayed and in what sequence the advertisements within a campaign should be displayed. Moreover, "display rules" may in one embodiment represent a set of criteria to determine what advertisements to display at specific locations based upon game environment variables such as but not limited to any of player location, player skill level, points that a game player has achieved through prior or current game play, the number of times the game player has viewed the advertisement, the specific theme or genre of the level of the game at which the ad is to display, the presence or existence of specific game objects, characters, weapons, equipment, or items, and a game player's, character's, or object's previous actions in relationship to the ad location or to other game players, characters, and/or objects within the proximity of the ad location.

For example, an advertising campaign may be uploaded by an advertiser to the remote server. The remote server then applies the advertising campaign to a driving game operating on a user's computer via API 190. In this example, the advertising campaign is for a new automobile. The advertising campaign contains several related advertising assets including, a skin for the new automobile, billboard advertising material, and a virtual store. The advertising campaign also includes the display rules for each of the assets. For example, a rule that the billboard advertising occurs first, then, the skin is applied to an opponent in the driving game, the opponent must have obtained a minimum skill level prior to having the skin applied, and, at the end of the driving game, after having viewed the skilled opponents performance driving automobile with the advertising skin, the virtual store provides the game user the opportunity to shop for the new automobile. In this example, the display rules include both timing data (at what time do the assets appear), and needed requirements before utilizing an asset (e.g., skill requirements before applying the skin, must be an opponents car). In this example, the advertising assets include data applied to existing parts of the game (billboard data applied to a billboard, an auto skin applied to an automobile game component), and an entire component to be added (virtual store). In the case of data applied to existing parts of the game, the remote server saves the advertising assets and sends them to various games hosted on user computers (e.g., via messages M to API 190). In the case of the virtual store, the virtual store is an add on component downloaded to the user's computer and then the virtual store is managed by the remote computer. The above provides an example of an advertising campaign, the specifics of any one campaign may vary significantly. Regardless of those specifics, the present invention provides a mechanism in which the add on components, advertising assets, data, rules, etc, may be registered, stored, and applied to games and other programs via the remote server.

Figure 6:
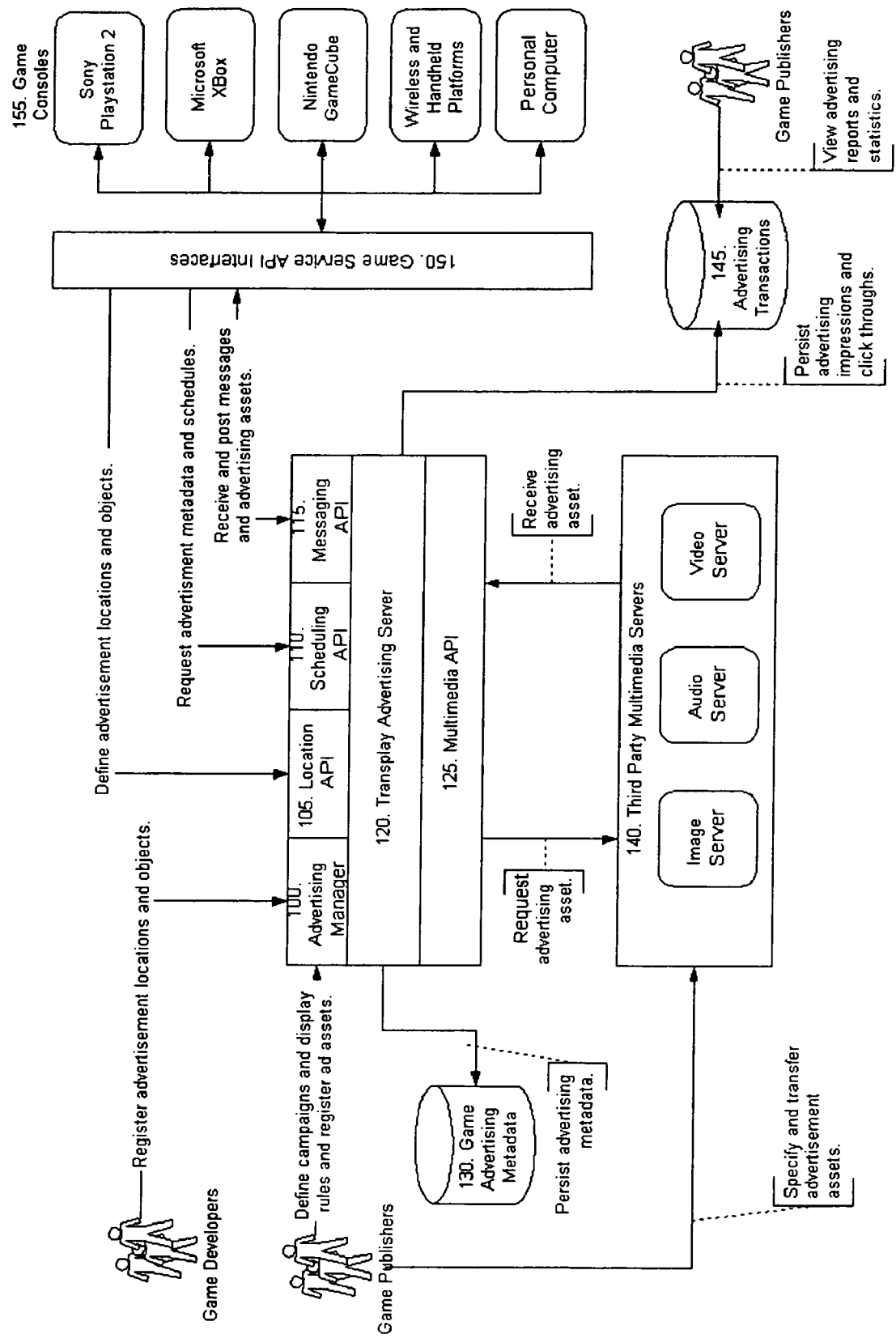
FIG. 6 is a block diagram example of the online advertising system according to an embodiment of the present invention.

Specify and transfer advertisement assets: In one embodiment, the present invention provides a method for specifying and transferring advertisement assets that have been registered with an online game advertising server (e.g., see FIG. 6, Item 120) as described in above with a multimedia server (FIG. 6, Item 140) such as an image, audio, or video server through the use of a user interface provided by a web based management console application (FIG. 4 and FIG. 6, Item 100). The terms "specifying" and "transferring" in this context means a method of identifying the advertisement asset located within one system and copying or moving (e.g., uploading the advertisement asset onto the system of a multimedia server).

Persist advertising metadata: In one embodiment, the present invention provides a method for persisting advertising metadata into a centralized storage device such as a relational database catalog or networked file system (e.g., see FIG. 6, Item 130). In this context, the term "metadata" refers to any describing property or feature of an advertisement, campaign, location, or display rule and any relationships between said objects. Examples of such relationships include but are not limited to: what advertisements belong to what campaigns, what campaigns are displayed at which locations during what times, at what sequence do the advertisements within a campaign display, and according to what game environment variables do advertisements display themselves.

Figure 21:
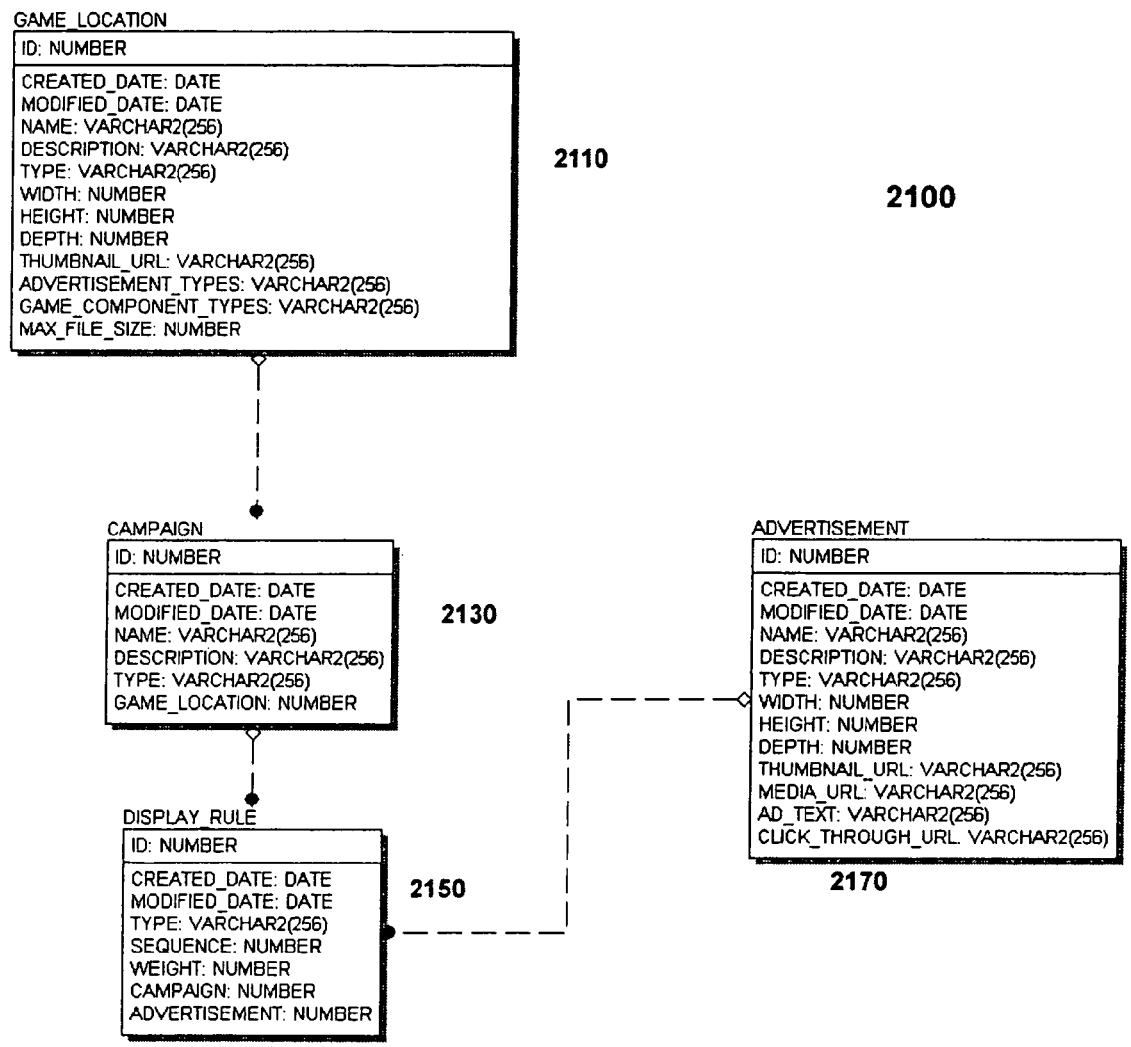
FIG. 21 is a relational database schema for metadata storage according to an embodiment of the present invention.

FIG. 21 illustrates an example relational database schema 2100 in which metadata may be stored in the example schema 2100, fields are maintained for linking a location 2110, a campaign 2130 for the advertisement, display rules 2150, and specific information for the advertisement 2170 (e.g., size, text, etc.)

Request advertising metadata and schedules: In one embodiment, the present invention provides a unique method for online games to request advertising metadata and schedules that determine what advertisements are to display in specified locations within the game during specified times and according to specific display rules previously determined by an administrative user. For example, programming running on the user computer (e.g., ad on component, game client, etc.) requests advertising from the remote server (e.g., at game start-up, or other strategic times during game operation). When requesting advertising metadata and schedules, game clients must pass the server information such as but not limited to the location identifiers that uniquely identify an ad within a game and any game specific environment variables such as object and character positioning and actions and game player profiles and skill set and experience level. This is achieved, for example, through the use of a Game Service and Scheduling APIs (Application Programming Interface) as depicted in FIG. 6, Items 150 and 110 that provide a standard programming interface (e.g., standardized interface) to request the advertising metadata identifying advertising campaigns and their respective display rules that are to display within a specified location during a specified time from any proprietary gaming console or client such as, but not limited to, Sony Playstation 2, Microsoft Xbox, Nintendo GameCube, any wireless or handheld game client, or a personal computer.

Figure 8:
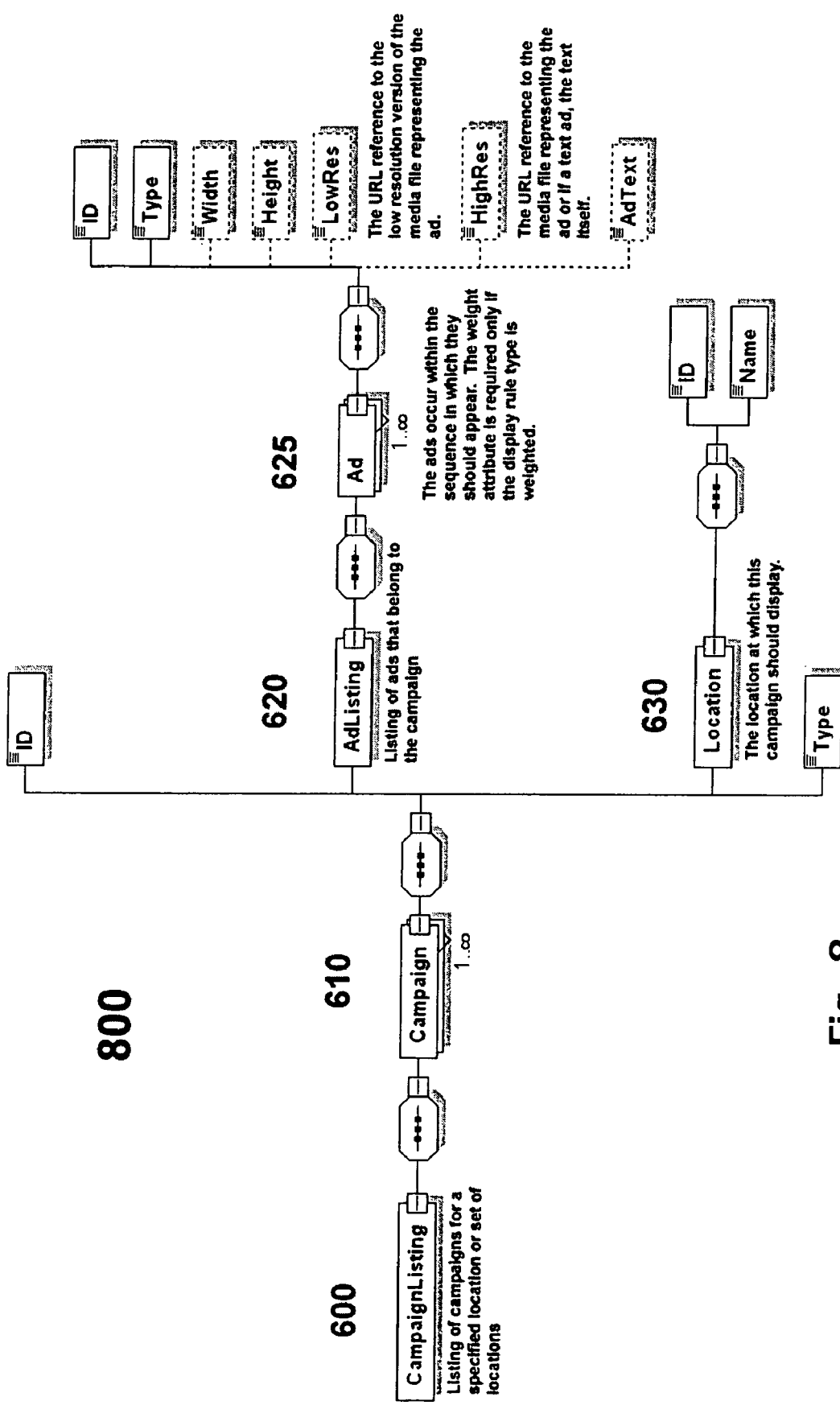
FIG. 8 is a schematic example of an ad campaign data structure according to an embodiment of the present invention.
Figure 13:
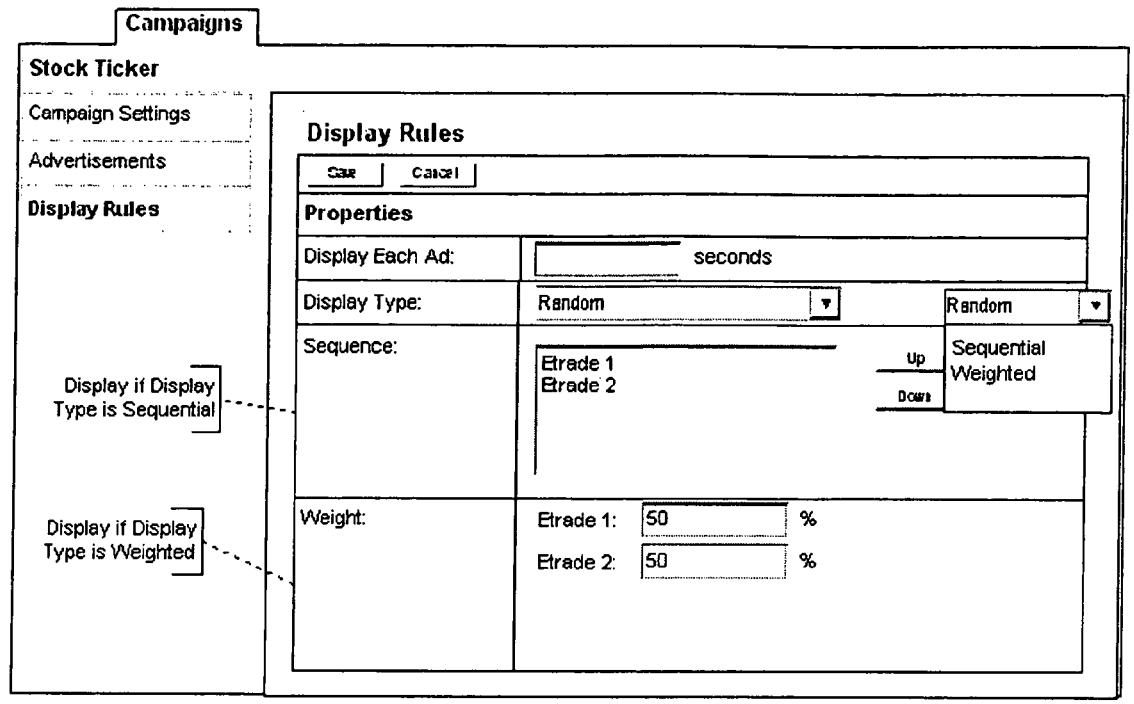
FIG. 13 is a screenshot example of how display rules for an advertisement campaign are defined using the Advertising Manager Management Console according to an embodiment of the present invention.

Receive and post messages and advertising assets: In one embodiment, the present invention provides a unique method for receiving and posting messages and advertising assets. After an online game running on a game console or user computer (client) requests advertising metadata and determines an ad campaign's display rules, schedule, and locations, it requests the advertising assets that represent the advertisement. The content of the messages passed between the client and game server may be in one embodiment an XML message containing ad campaign listing metadata. For example, FIG. 7 illustrates an XML format structure that may be utilized to send metadata and which corresponds to the example structure 800 for the metadata as shown in FIG. 8. Specifically, item 500 in FIG. 7 and item 600 in FIG. 8 represent a root level parent object CampaignListing that contains one or more Campaign objects, item 510 and 610. Each Campaign object has an id attribute that uniquely identifies the Campaign within the system and contains the data structure elements AdListing (520, 620) and Location (530, 630). An AdListing data structure contains Ad elements (525, 625) which in turn contain attributes and elements such as id, name, description, width, height, asset URL, etc. that describe an advertisement within the specified ad campaign. A Location object (530, 630) represents the location within a game at which advertisements are to appear and contains attributes and elements such as ID, name, and description.

When requesting advertising assets, the game client may, for example, pass the advertising server information describing the specific run time parameters that the ad should take. Such parameters include but are not limited to ad dimensions, duration of video or animation, color scheme, transparency, file format, and file size. This is achieved through Game Service and Messaging APIs such as those depicted in FIG. 6, Items 115 and 150 and that in one embodiment provide a transactional, synchronous model of downloading advertising assets on a demand basis. In another embodiment the present invention provides an asynchronous method of delivering advertising assets on a scheduled broadcast delivery mechanism in which the advertising server uploads advertising assets to each subscribing game console or client. When a successful transaction has been fulfilled both selling and buying parties are notified via a message sent by invoking a standard Messaging API interface provided by the game commerce server.

Request advertising asset: In one embodiment, the present invention provides a method for requesting an advertising asset from a multimedia server. In this context "advertising asset" is defined as a multimedia file such as an image, video, or audio file that represents one or many parts or the whole of an advertisement to be displayed within an online game. A "multimedia server" such as that depicted in FIG. 6, Item 140 is any server that is responsible for the dynamic retrieval, resizing, sampling, compositing, or generation of such files. The requesting of such assets may be achieved through the use of a Multimedia API (FIG. 6, Item 125) that contains interfaces to make calls to a multimedia server to allow for the dynamic retrieval, resizing, sampling, compositing, or generation of images, video, or audio files.

Receive advertising asset: In one embodiment, the present invention provides a method for receiving an advertising asset from a multimedia server. In this context "advertising asset" is defined as a multimedia file such as an image, video, or audio file that represents one or many parts or the whole of an advertisement to be displayed within an online game. A "multimedia server" is any server that is responsible for the dynamic retrieval, resizing, sampling, compositing, or generation of such files. The receipt of such assets may be achieved through the use of a Multimedia API (FIG. 6, Item 125) that contains interfaces to make calls to a multimedia server to allow for the dynamic retrieval, resizing, sampling, compositing, or generation of images, video, or audio files.

Persist advertising impressions, click-throughs, and game actions: In one embodiment, the present invention provides a unique method for persisting advertising impressions, click-throughs, and game actions taken on an ad into a centralized storage device such as a relational database or networked file system. "Advertising impressions" in this context are defined as the number of times that game players viewed a particular advertisement within an online game and "click-throughs" is defined as the number of times that a game player "clicked" on the advertisement to display more detailed information related to the core topic of the advertisement. The advertising impressions are, for example, tabulated by the user computer and forwarded to the remote computer. The remote computer may also tabulates statistics on the number of accesses for each ad and/or ad type. "Game actions taken on an ad" is defined in one embodiment as any action performed directly or indirectly by a game player, character, or object on an advertisement that is represented as a game object within the game. Examples of such actions include but are not limited to hitting, throwing, shooting, jumping on, eating, kicking, speaking, shouting at, and running into an ad object. Information such as, but not limited to, the user name of the game player viewing or clicking the ad, the current time and date, demographic information about the viewer, the length of time that the ad was viewed or interacted with, and the types of actions taken on an ad object is saved as part of the transaction. The act of persisting advertising impressions, click-throughs, and game actions in one embodiment is performed by an Advertising Server such as that depicted in FIG. 6, Item 120 using a relational storage database such depicted in FIG. 6, Item 145. The impressions data is stored in the database.

View advertising reports and statistics: In one embodiment, the present invention provides a unique method for viewing advertising reports and statistics about advertising impressions, click-throughs, and game actions taken on an ad. Through the use of a user interface such as a web based application (FIG. 6, Item 100), game publishers or system administrators may review reports that illustrate details such as but not limited to ad viewership by time period, impressions, click-throughs, and ad actions by demographic group or region, and impression to click-through success rates and ratios. Data to generate the reports is stored in one embodiment in a relational database such as that depicted in FIG. 6, Item 145.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Data used by the software may be retrieved from different sources (local or remote) and either permanently or temporarily stored (before, during, or after any processing) by utilizing any of text files, delimited files, database(s), or other storage techniques. Ultimately, such computer readable media further includes software for performing the present invention, as described above.

Included in the programming (software) of the general/specialized computer or microprocessor are software modules for implementing the teachings of the present invention, including, but not limited to, finding updateable areas of a program, transferring components from a remote server to a program, managing areas/locations with a remote program, including organizing displays and facilitating purchase of advertised items displayed, installing add-on components into a program, and the display, storage, or communication of results according to the processes of the present invention.

The present invention includes substantial discussion regarding game objects which includes game objects which are programming modules that may be resident in gaming software or imported into gaming software. Game objects may also refer to virtual objects that are used as part of the game. The underlying programming of a virtual object may be referred to as a game object.

In describing the present invention, billboards, coupons, treasure, and other items are used to describe various game parts and/or advertisements. These are examples and the present invention is applicable to any type of advertising presentable in a gaming or on-line format and include any type of value or known physical object.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A system for importing aspects of game enhancements into a game program played on a user device, the system comprising:

a user device configured for executing game programs, including a game program having at least one portion configured to be populated with one or more add-on components from a remote source, wherein at least one of the one or more add-on components is associated with advertising, implements a feature of the game program in which advertisements are displayed within a billboard that appears within a game playing space of the game program, interacts with a user to provide additional information about a product being advertised, and is selected from the group consisting of an executable program component, source code, and a software module, the game program providing an application programming interface for interacting with a remote source to download an add-on component from a remote source to the user device, to receive enforcement rules associated with the display of advertisements, and to receive management messages for implementing a feature of a downloaded add-on component, wherein the add-on component executes in accordance with the received enforcement rules and management messages; and a management component of the remote source for managing at least some aspects of user interactions with the one or more add-on components, the management component configured to provide one or more add-on components from the remote source to the user device, to send enforcement rules to the user device, and to send management messages to the user device without stopping the game program, wherein the management component is further configured to manage at least some aspects of user interactions with the one or more add-on components, wherein managing at least some aspects of user interactions with the one or more add-on components comprises:

managing display schedules for the presentation of the one or more add-on components at the user device;

managing enforcement of rules associated with displaying and selecting the one or more add-on components at the user device;

sending a management message to an add-on component at the user device, the management message comprising information used to implement at least one feature of the one or more add-on components;

receiving a response message about selection of an aspect of the one or more add-on components; or receiving a response message about a user inquiring into or purchasing a product or service advertised using the one or more add-on components.

2. A system for importing aspects of game enhancements into a game program played on a user device, the system comprising:

a user device configured for executing game programs, including a game program having at least one portion configured to be populated with one or more add-on components from a remote source, wherein at least one of the one or more add-on components is associated with advertising, implements a feature of the game program in which advertisements are displayed within a billboard that appears within a game playing space of the game program, interacts with a user to provide additional information about a product being advertised, and is selected from the group consisting of an executable program component, source code, and a software module, the game program providing an application programming interface for interacting with a remote source to download an add-on component from a remote source to the user device, to receive enforcement rules associated with the display of advertisements, and to receive management messages for implementing a feature of a downloaded add-on component, wherein the add-on component executes in accordance with the received enforcement rules and management messages; and a management component of the remote source for managing at least some aspects of user interactions with the one or more add-on components, the management component configured to provide one or more add-on components from the remote source to the user device, to send enforcement rules to the user device, and to send management messages to the user device without stopping the game program wherein the management component is part of a server that is located remotely from the user device.

* * * * *